United States Patent [19]

Cannady et al.

[11] 3,726,940
[45] Apr. 10, 1973

[54] REDUCING HF-WATER PHASE DISPOSAL IN ALKYLATION

[75] Inventors: William P. Cannady; Joe Van Pool, both of Bartlesville, Okla.

[73] Assignee: Phillips Petroleum Company, Bartlesville, Okla.

[22] Filed: Mar. 26, 1971

[21] Appl. No.: 128,383

[52] U.S. Cl. ...................... 260/683.48, 208/DIG. 1
[51] Int. Cl. ................................................ C07c 3/54
[58] Field of Search ..................... 260/683.48; 137/2, 137/119

[56] References Cited

UNITED STATES PATENTS 3,410,759  11/1968  Fontenot et al. .................260/683.48
3,273,576  9/1966   Fluegel et al. ............................137/2
3,031,105  4/1962   Walker .................................137/119

Primary Examiner—Delbert E. Gantz
Assistant Examiner—G. J. Crasanakis
Attorney—Young and Quigg

[57] ABSTRACT

A method and apparatus for processing a hydrogen fluoride-containing, analyzed catalytic fluid, separating therefrom a hydrogen fluoride-water phase and recycling or disposing of said phase in response to the concentration of water in the analyzed fluid relative to a desired value of said concentration.

4 Claims, 2 Drawing Figures 3,726,940

INVENTOR.
W. P. CANNADY
J. VAN POOL
BY Young & Quigg
ATTORNEYS

REDUCING HF-WATER PHASE DISPOSAL IN ALKYLATION

In a hydrogen fluoride catalyzed alkylation system for the reaction of olefins with isoparaffins, the acid catalyst comprises a liquid mixture of hydrogen fluoride, acid-soluble oil, and water. These systems are well known by those skilled in the art of hydrogen fluoride alkylation.

In the operation of a hydrogen fluoride alkylation system, the acid catalyst can be separated and recovered from hydrocarbons being processed by passing the mixture into an acid settling tank. For the purpose of refortification of the catalyst, a portion of the acid phase is passed to a rerun distillation column where a portion of the reconcentrated hydrogen fluoride is taken off as overhead product and returned to the acid system, and a mixture comprising acid-soluble oil, water, and a decreased amount of hydrogen fluoride is discharged from the lower portion of said column. This mixture is generally discharged from the alkylation system and disposed of.

Disposal of this mixed acid-oil stream has presented problems owing to the toxicity of the hydrogen fluoride contained in said stream. In order to reduce the labor, equipment, and other expenditures required to properly dispose of this toxic fluid and better protect the environment from accidental toxic damage from this fluid, a unique handling method and apparatus has been discovered.

The method and apparatus of this invention comprises passing the fluid mixture to a liquid separating vessel, separating the acid-soluble oil phase from the hydrogen fluoride-water phase of said mixture and recycling to the catalytic system said hydrogen fluoride-water phase in response to a fluid analysis indicating a concentration of water less than a preselected value.

Other aspects, objects, and advantages of the present invention will become apparent from a study of the disclosure, the appended claims, and the drawings.

The drawings are diagrammatic views of the apparatus of this invention and a portion of the associated apparatus of a hydrogen fluoride alkylation system.

Figure 1:
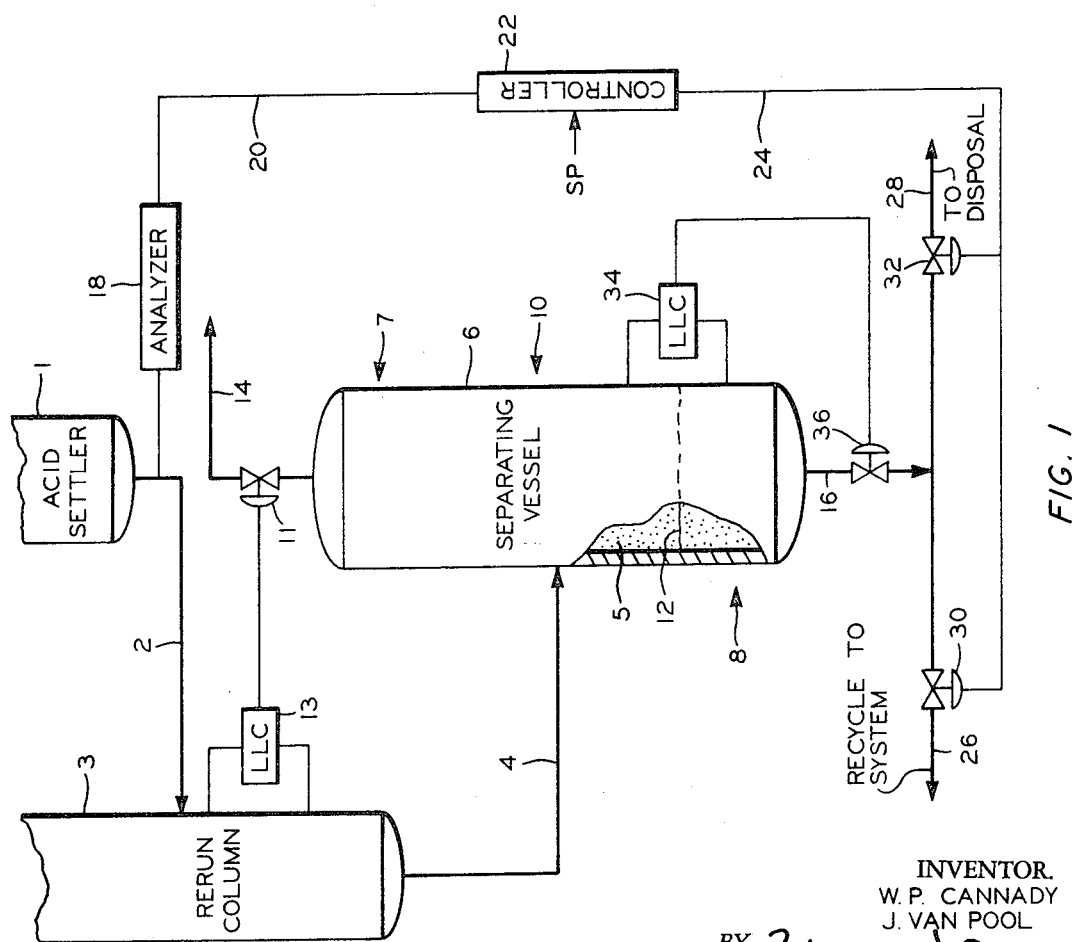
FIG. 1 shows an embodiment of the apparatus and the controls thereof.

Referring to FIG. 1, an acid settling vessel 1 of the acid system of a hydrogen fluoride alkylation system has a conduit 2 attached to a lower portion thereof for the passage of a fluid mixture comprising acid-soluble oil, hydrogen fluoride and water from the acid settler 1 to a rerun column 3. This mixture comprises, for example, about 90 percent by weight hydrogen fluoride, 2 percent water, and 8 percent acid-soluble oil.

In the rerun column 3, a portion of the hydrogen fluoride is separated by distillation from the mixture, recovered, and recycled to the acid system to refortify same as is known in the art.

A separating vessel 6 is connected to the lower portion of the rerun column by a conduit 4 for the passage of a mixture of acid-soluble oil, hydrogen fluoride, and water from the rerun column to the separating vessel 6. This mixture has a reduced concentration of hydrogen fluoride therein, for example about 35 percent or less. The separating vessel 6 has a chamber 5, upper and lower portions 7,8 and a middle portion 10 with said conduit 4 connected to the separating vessel in communication with the chamber 5 at preferably the middle portion 10 thereof.

In separating vessel 6, the acid-soluble oil phase is separated by density from the hydrogen fluoride-water phase and forms an interface 12 therein. The acid-soluble oil is removed through a first conduit 14 that is in communication with the upper portion 7 of the separating vessel 6. Valve 11 in conduit 14 is positioned by liquid level controller 13 associated with the lower portion of column 3 to maintain a desired liquid level therein.

A second conduit 16 is connected to the lower portion 8 of the separating vessel 6 for discharging the hydrogen fluoride-water phase therefrom.

An analyzer 18, preferably a water concentration analyzer, is located and samples upstream of the rerun column 3 and/or from the acid phase of settler 1 for analyzing the fluid upstream of said rerun column and delivering a signal through line 20 that is representative of the water concentration in said fluid.

A controller 22 is connected to the analyzer through line 20 for receiving the signal from the analyzer, comparing said signal to a preselected set point, and delivering a controlling signal through line 24 responsive to that comparison.

A third conduit 26 connects conduit 16 with the settler 1 for recycling the hydrogen fluoride-water phase thereto and a fourth conduit 28 connected to conduit 16 is provided for passing said hydrogen fluoride-water phase to disposal.

A flow controlling means, here shown as first and second valves 30, 32, is connected to the second conduit 16 and respective third and fourth conduits 26,28 for selectively directing fluid flowing through the second conduit into either the third or fourth conduit 26,28. The flow controlling means can also be a three-way valve as known in the art.

The first and second valves 30,32 are operationally connected to line 24 for receiving a signal from the controller. The first and second valves 30,32 are constructed so that upon receipt of the control signal through line 24 as produced by controller 22 responsive to the comparison therein of an analysis lower in value than the set point of the controller 22, the first valve 30 is opened and the second valve 32 is closed and upon receipt of the signal as produced by controller 22 responsive to the comparison therein of an analysis higher in value than the set point of the controller 22, the first valve 30 is closed and the second valve 32 is opened. This technique may be described as opposed or split range valve operation, such as employing two control valves, one of which is normally open, the other being normally closed, each calibrated to begin to operate at about mid scale of the output of controller 22.

During normal operation, the first valve 30 is generally open, the second valve is generally closed, and a liquid level controller 34, monitoring and controlling the interface between the acid-soluble oil phase and the hydrogen fluoride-water phase, positions valve 36 associated with separating vessel 6 thereby controlling the removal of hydrogen fluoride-water phase from the separating vessel through the third conduit 26 back to the acid system. Where an excessive water concentration is detected in the system by the analyzer 18 resulting from a water leak into the system, for example, the hydrogen fluoride-water stream is discharged from the system in order to prevent corrosion and degradation of the reaction in said system. The set point of the controller 22 is of a value preferably representative of the optimum water concentration of the fluid stream flowing through conduit 2 into the rerun column, for example a value representative of about 2 weight percent water.

It should be understood, however, that the concentrations of the other components in the stream can be analyzed and the detected total concentration subtracted from the whole (100 percent) to obtain the concentration of water in said stream, but for simplicity it is preferred that the analyzer be a water analyzer such as disclosed in U.S. Pat. No. 3,424,975.

Figure 2:
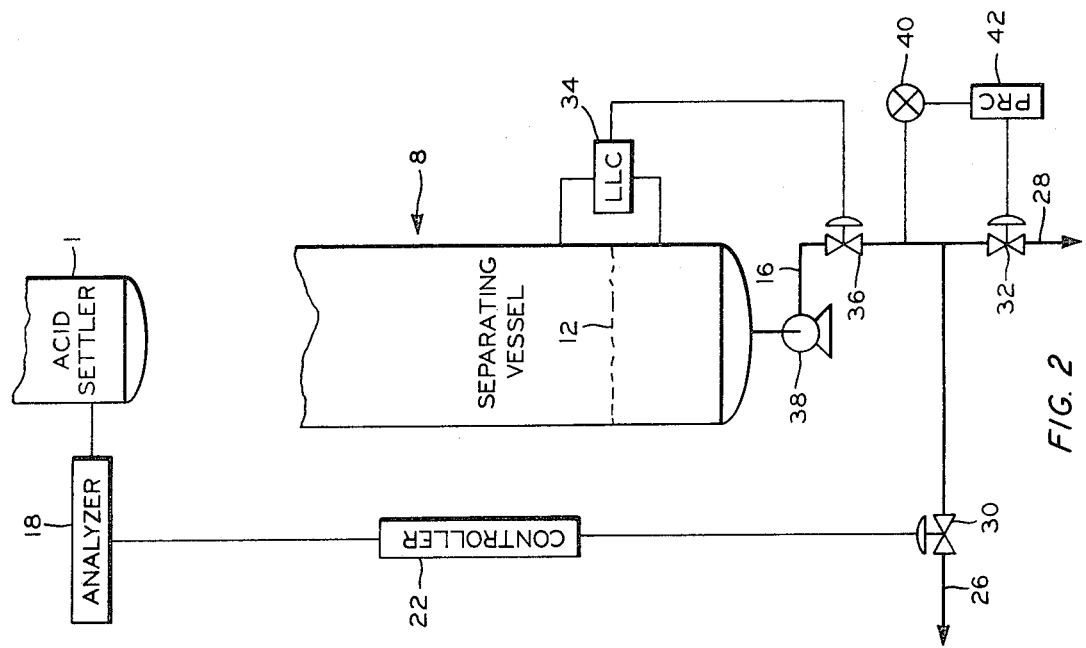
FIG. 2 shows a portion of the apparatus with controls of another embodiment.

Referring to FIG. 2, a pump 38, preferably a centrifugal pump, is associated with the second conduit 16, the first valve 30 is a normally open valve operatively connected to the controller 22, and the second valve 32 is a back-pressure-controlled, normally closed valve. The second valve 32 of this embodiment has associated therewith a conventional pressure measuring means 40 connected to the second conduit 16 downstream of the pump 38 and is connected to a conventional controlling means 42 of the second valve 32 for opening valve 32 in response to a pressure within said second conduit 16 greater than the pressure set point of said controlling means 42, so that when pump 38 discharges the hydrogen fluoride-water stream 16 from vessel 8 in accordance with liquid level controller 34 and valve 36, and valve 30 is closed by virtue of higher-than-desired water concentration in the acid catalyst, then controller 42 via valve 32 takes action to discharge this stream to disposal means not shown.

Here the analyzer is in communication with the lower portion of the acid settling tank. An example pressure set point of the controlling means 42 of this embodiment may be 100 psi.

In the method of this invention, the above-described fluid mixture passes from the lower portion of an acid settling vessel 1, for example, into a rerun column where a portion of the hydrogen fluoride is separated and removed therefrom. The water, acid-soluble oil, and remaining hydrogen fluoride is thereafter discharged into the chamber 5 of the separating vessel 6.

In the separating vessel 6, the acid-soluble oil phase is separated from the hydrogen fluoride-water phase and said oil is recovered therefrom. The separated hydrogen fluoride-water phase is discharged from the separating vessel 6 through the second conduit 16 by opening of the controlling valve 36 in response to upward movement of the interface 12 between the oil phase and the hydrogen fluoride-water phase. This controlling valve 36 and associated equipment maintains the interface 12 at a preselected height within the separating vessel 6 for optimum separation of the fluid phases therein.

The feedstream to the rerun column or the fluid in the lower portion of the acid settling vessel is analyzed by the analyzer and a signal representative of that analysis is delivered through line 20 to a controller 22. In controller 22 the received signal is compared to a preselected set point and a controlling signal responsive to that comparison is delivered to the valve means.

In the embodiment shown in FIG. 1, the first valve 30 is maintained in an open position and the second valve is maintained in a closed position during receipt of a signal from the controller 22 representative of a water content analysis less than the set point of the controller 22. This causes the hydrogen fluoride-water phase to be recycled to the system thereby avoiding disposal problems and toxic dangers. Where the analyzer 18 detects a water content greater in value then the set point of the controller 22, said controller functions to close the first valve 30 and open the second valve, thereby directing the hydrogen fluoride-water phase to disposal. As described above, this fluid is generally directed to disposal only where the upstream equipment has malfunctioned. It should be understood that the valves can also be manually operated to reduce the amount of fluid in said system where desired.

In the embodiment shown in FIG. 2, a pump 38 operates to deliver fluid from the separating column into the second conduit 16. An interface liquid level controller is associated with the column and an associated controlling valve 36 is positioned downstream of the pump 38 for maintaining the interface 12 at a preselected elevation within the separating column. The pressure downstream of the pump is measured by the pressure measuring means 40 and a signal representative of that pressure is delivered to the controlling means 42 of the second valve 32. The first valve 30 receives a signal from the controller 22 and associated analyzer 18 as set forth above.

During receipt of a signal representative of an analyzed water content less than the set point of the controller 22, the first valve 30 remains normally open and the second valve 32 remains normally closed thereby recycling fluid from the separating column to the acid system. Upon receipt of a signal from the controller 22 representative of an analyzed water content greater than the set point of the controller, the first valve 30 is caused to close. Since pump 38 is continuously operating, the pressure measured by the pressure measuring means 40 increases to a value greater than the set point of the controlling means 42 at which time the second valve 32 is caused to open and the fluid is discharged to disposal. Owing to the pressure sensitive control of the second valve 32, the fluid discharging from the separating column is also diverted to disposal where the third conduit 26 or other associated downstream equipment becomes plugged and the pressure as measured by the pressure measuring means 40 increases to or above the preselected value.

The apparatus and method of this invention therefore provides for the separation of the acid-soluble oil phase from the hydrogen fluoride-water phase thereby conditioning said hydrogen fluoride-water phase for recycle to the system under preselected conditions thereby protecting the system against undue contamination but also to reduce the problems associated with the costly disposing of a toxic and potentially valuable hydrogen fluoride-containing stream.

Other modifications and alterations of this invention will become apparent to those skilled in the art from the foregoing discussion and accompanying drawing and it should be understood that this invention is not to be unduly limited thereto.

What is claimed is:

1. A method for reducing the amount of hydrogen fluoride and water disposal from a hydrogen fluoride alkylation system having a rerun column with a feedstream flowing thereinto, comprising:

passing a first stream comprising acid-soluble oil, hydrogen fluoride, and water from the rerun column into a separating vessel;

separating the acid-soluble oil from the hydrogen fluoride-water phase within the separating vessel;

discharging the hydrogen fluoride-water phase from the separating vessel;

analyzing the feedstream of the rerun column to determine the water content thereof;

passing a signal representative of the analysis to a controller;

comparing the signal to a preselected set point in the controller and establishing a control signal representative of the difference therebetween;

recycling the hydrogen fluoride-water phase discharging from the separating column back to the hydrogen fluoride alkylation system in response to the control signal indicating a water content less than the preselected set point; and discharging the hydrogen fluoride-water phase from the hydrogen fluoride alkylation system in response to the control signal indicating a water content greater than the preselected set point.

2. A method, as set forth in claim 1, including maintaining an interface between the acid-soluble oil and the hydrogen fluoride-water phase at a preselected height within the separating vessel.

3. A method, as set forth in claim 1, wherein the feedstream of the rerun column is analyzed at an acid settling vessel positioned upstream of the rerun column and in communication therewith.

4. A method, as set forth in claim 1, wherein the set point is representative of a water content of about 2 percent by weight.

* * * * *